(12) United States Patent
Fawley

(10) Patent No.: US 8,602,249 B2
(45) Date of Patent: Dec. 10, 2013

(54) PRESSURE VESSEL HEAD WITH INVERTED NECK

(75) Inventor: Norman C. Fawley, Cayucos, CA (US)

(73) Assignee: NCF Industries, Inc., Cayucos, CA (US)

(*) Notice: Subject to any disclaimer, the term of this patent is extended or adjusted under 35 U.S.C. 154(b) by 374 days.

(21) Appl. No.: 12/181,966

(22) Filed: Jul. 29, 2008

(65) Prior Publication Data
US 2010/0025403 A1 Feb. 4, 2010

(51) Int. Cl.
*F17C 13/06* (2006.01)
*B65D 1/20* (2006.01)

(52) U.S. Cl.
CPC .. *F17C 13/06* (2013.01); *B65D 1/20* (2013.01)
USPC .......................................... 220/582; 220/601

(58) Field of Classification Search
CPC ........ F17C 13/06; B65D 1/20; B65D 39/084; B65D 39/082
USPC ........... 206/0.6; 220/254.8, 254.1, FOR. 203, 220/601, 582, 804, 801, 588, 586, 790, 789, 220/787, 784, 780, 200; 215/360, 358, 356, 215/45, 43, 200
IPC ............ B65D 39/12, 39/08, 39/00; F17C 13/06
See application file for complete search history.

(56) References Cited

U.S. PATENT DOCUMENTS

| | | | | |
|---|---|---|---|---|
| 1,861,756 A | * | 6/1932 | Schwartz | 220/214 |
| 1,929,412 A | * | 10/1933 | Dillhoefer | 220/214 |
| 1,945,495 A | * | 1/1934 | Rieke | 220/258.3 |
| 3,016,462 A | * | 1/1962 | Hendricksen et al. | 250/506.1 |
| 3,047,191 A | * | 7/1962 | Young | 220/588 |
| 3,419,173 A | * | 12/1968 | Verlinden | 220/4.05 |
| 3,935,968 A | * | 2/1976 | Rausing | 222/479 |
| 4,589,564 A | * | 5/1986 | Olster et al. | 220/582 |
| 4,674,648 A | * | 6/1987 | Przytulla | 220/601 |
| 5,577,630 A | * | 11/1996 | Blair et al. | 220/581 |
| 6,135,308 A | * | 10/2000 | Fang | 220/590 |
| 6,227,402 B1 | * | 5/2001 | Shimojima et al. | 220/581 |
| 6,230,921 B1 | * | 5/2001 | Berglund | 220/319 |
| 6,301,319 B1 | * | 10/2001 | Merkovsky et al. | 376/205 |
| 6,779,565 B1 | * | 8/2004 | Fawley | 141/1 |
| 2003/0189053 A1 | * | 10/2003 | Felbaum | 220/582 |
| 2007/0164561 A1 | * | 7/2007 | Kwon et al. | 285/45 |

FOREIGN PATENT DOCUMENTS

GB 2033567 A * 5/1980 ................ F17C 1/14

* cited by examiner

*Primary Examiner* — Jacob K Ackun
*Assistant Examiner* — Robert J Hicks
(74) *Attorney, Agent, or Firm* — Blakely Sokoloff Taylor & Zafman LLP

(57) ABSTRACT

A pressure vessel for transporting compressed gas at very high pressure without failing includes an inverted neck at the head so that pressure from compressed gas is applied to the neck in a converging manner. A plug valve is inserted into the opening defined by the neck to seal the pressure vessel. As pressure from the compressed gas enclosed in the pressure vessel increases, engagement between the neck and the plug also increases. Therefore, the pressure vessel can withstand higher levels of pressure from compressed gas before failing during hydro and burst testing.

7 Claims, 4 Drawing Sheets

PRESSURE VESSEL HEAD WITH INVERTED NECK

BACKGROUND

1. Field of the Invention

The present invention relates to an apparatus for transporting compressed gas. Specifically, embodiments of the invention relate to pressure vessels for transporting compressed gas at very high pressure without failing.

2. Description of the Related Art

Gases or fluids under pressure and similar materials require specialized pressurized containers for transportation. Natural gas and similar materials are often procured at locations that are remote from refineries and storage facilities, as well as the end users of the materials. Large volumes of pressurized gas are transported from field to market using various forms of transportation.

One way to transport gas between locations is through the use of pressure vessels. In general, a pressure vessel is a heavy steel module containing gas so that the gas can be moved from one location to another. A neck provides an opening to the pressure vessel and a plug or valve inserted into the neck prevents any gas from entering or exiting the pressure vessel.

Pressure vessels can withstand the pressure of enclosed gas up to a certain level. At high pressure (generally around 7500 psi for heavy duty composite reinforced pressure vessels), pressure vessels fail because they are unable to contain the gas. In particular, the high pressure exerts force outwardly on the internal walls of the head, causing the head to expand outwardly and the plug or valve to disengage from contact with the neck. When the plug is not fully engaged with the interior walls of the neck, the enclosed pressurized gas escapes from the pressure vessel through the space between the plug and the neck. This scenario presents a problem, as various gases are contained and transported at a pressure of 3000 psi this requires a test pressure of 5000 psi and a burst rating of 7500 psi. Generally, safety guidelines require the burst rating be at least 2.4 times the operating pressure. As explained below, compliance with this standard is difficult with existing technology. Typical composite reinforced pipe uses a ½" metal shell with ½" of composite reinforcement and ⅞" heads welded to the ends of the metal shell. Because composite reinforcement doubles the hoop strength of the shell, the head becomes the probable point of failure.

FIG. 1 is a diagram of a cross-sectional view of a pressure vessel head in the prior art. FIG. 1 depicts an area of weakness that may precipitate failure in a pressure vessel head 110 when the pressure vessel contains gas at high pressure. This illustration includes a pressure vessel head 110 that forms one end of a pressure vessel (not shown) and a neck 120 that provides an opening in the pressure vessel head 110. Note that the neck 120 protrudes distally from the pressure vessel head 110. The head 110 and neck 120 combination is typically extruded from a unitary blank to avoid weaknesses that result when the neck is welded to the head. Welding the neck to the head creates a shift spot at the weld. This less flexible spot can cause premature cyclic failure. Typically, one seeks to get at least 10,000 to 20,000 cycles out of a pressure vessel. The weld also has the potential to introduce flaws during the welding process. These factors taken together result in a welded neck being a significant failure point.

An o-ring 130 and plug 140 are engaged in the opening of the neck 120 to prevent gas contained in the pressure vessel from escaping. The gas contained in the pressure vessel creates pressure on an interior portion of the pressure vessel head 110 in the direction of the arrows 150 depicted in FIG. 1. The pressure 150 is directed in an outward direction from inside the pressure vessel head 110, pushing against the internal walls of the pressure vessel head 110 and neck 120.

When pressure 150 from the gas contained in the pressure vessel is high enough, the force from the pressure 150 causes the neck 120 and the opening created by the neck 120 to expand. When the neck 120 expands away from the plug 140, the plug 140 and o-ring 130 no longer provide an effective seal of the opening to prevent gas from escaping from the pressure vessel (even if the plug 140 may still loosely rest in the opening defined by the neck 120). More often the failure is catastrophic with the plug 140 being ejected at high speed. The failure to contain gas at high pressure presents a problem of a pressure vessel in the prior art.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 2:
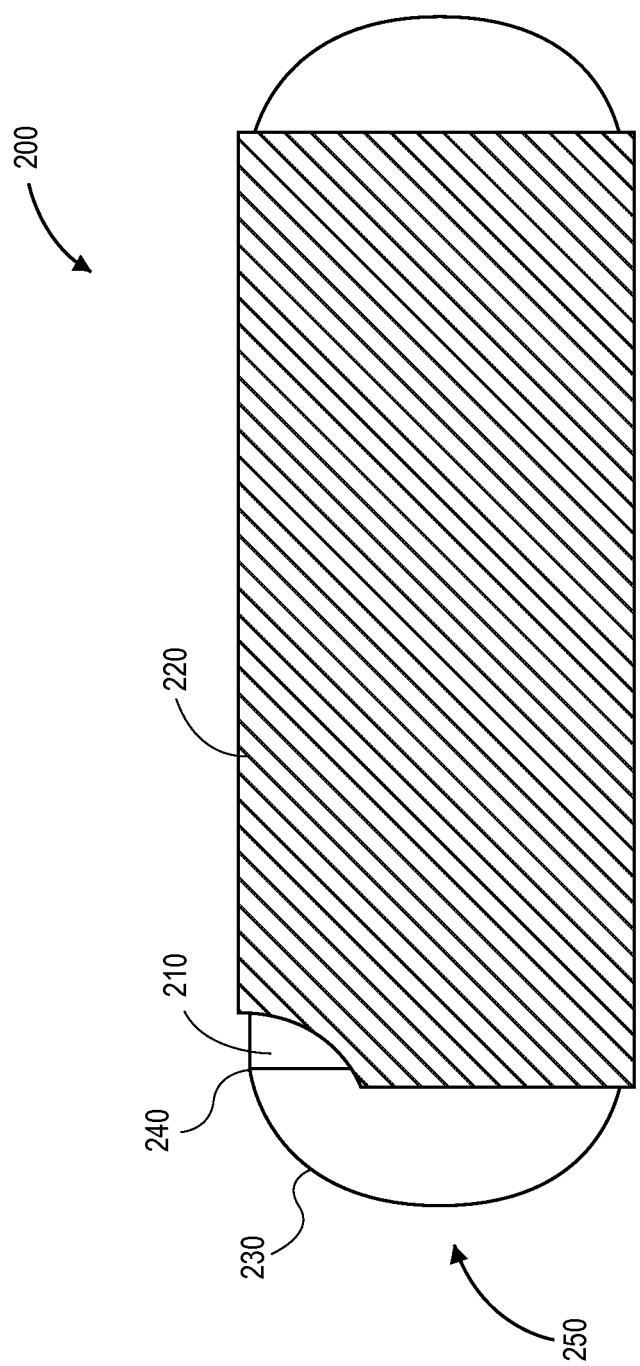
FIG. 2 is a diagram of an exterior side view of one embodiment of a pressure vessel.

FIG. 2 is a diagram of an exterior side view of one embodiment of a pressure vessel 200. The pressure vessel 200 is used to transport gas from one location to another.

The composite reinforced pressure vessel 200 includes a cylindrical shell 210 and arcuate head 230 welded together 240 to form a container for holding gas. The cylindrical shell 210 and arcuate head 230 may be manufactured from metal, metal alloy, or elastic metal composite. Examples are steel, stainless steel, high strength low alloy steel, carbon steel, monel, inconel, hastelloy, and titanium. The weld 240 between the cylindrical shell 210 and arcuate head 230 may be overmatched in strength and/or volume. To overmatch the weld 240 in terms of strength, the weld 240 may be composed of higher strength metal than the metal of the cylindrical shell 210 and arcuate head 230. For example, the weld material can have a tensile strength of 10%-12% greater than the material of the cylindrical shell 210 and arcuate head 230. To overmatch the weld 240 in terms of volume, a larger volume of material per unit area may be used for the weld 240 than for the cylindrical shell 210 and arcuate head 230. For instance, the volume per unit may be 15%-18% greater for the weld 240 than for the cylindrical shell 210 and arcuate head 230.

The cylindrical shell 210 is wrapped circumferentially with a composite reinforcement 220 to strengthen the cylindrical shell 210 to improve the hoop strength of the walls of the vessel 200. This yields a two time increase in hoop strength of the shell. Composite reinforced pressure vessels are described in U.S. Pat. No. 6,779,565. Otherwise, the increased ability of the pressure vessel 200 to withstand higher pressure because of the improved arcuate head 230 would be limited by the lower pressure tolerance of the cylindrical shell 210.

The material used to make the composite reinforcement 220 varies depending on the reinforcement characteristics desired for the pressure vessel 200. For example, the composite reinforcement 220 can be made with isopolyester resin matrix, polyester, aramid, or other glass fiber materials. Characteristics such as strength, heat distortion temperature, and elongation are taken into consideration when selecting the material used to make the composite reinforcement 220. For example, in high temperature environments, an isopolyester with lower elongation would be desired for the composite reinforcement 220, while in low temperature environments, an isopolyester with higher elongation would be desired for the composite reinforcement 220. In addition, the thickness of the composite reinforcement 220 may be selected based on factors such as operating pressure and the strength of the cylindrical shell 210, arcuate head 230, and the weld 240. While any thickness of composite reinforcement 220 would provide further reinforcement to the cylindrical shell, a composite reinforcement 220 of greater thickness provides more reinforcement than a composite reinforcement 220 of lesser thickness. In general, a composite reinforcement 220 would add about 20% to the weight of the steel pressure vessel 200 and increase the pressure capability of the pressure vessel 200 to contain gas by about 100%.

Figure 1:
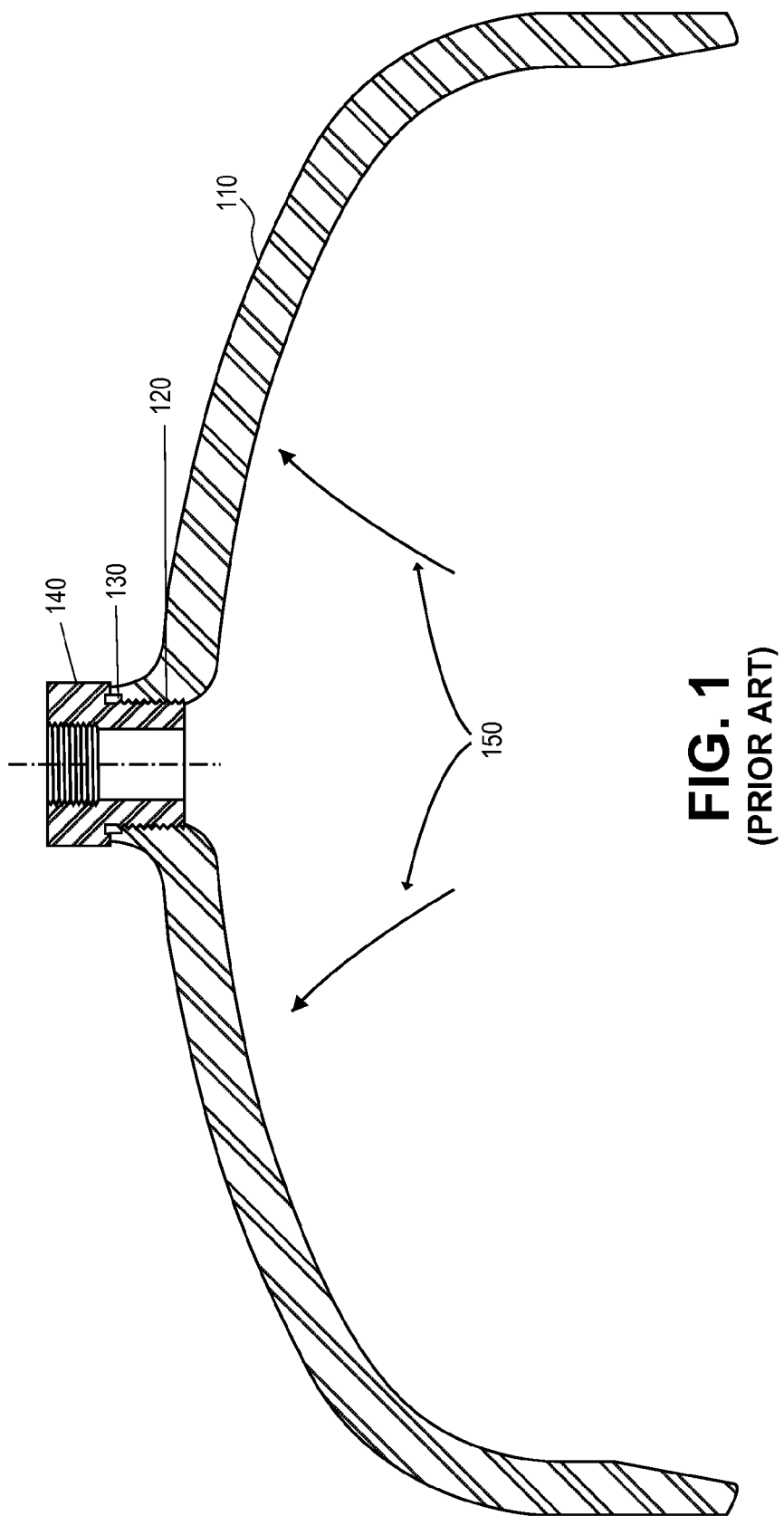
FIG. 1 is a diagram of a cross-sectional view of a pressure vessel head in the prior art.

The opening 250 of the pressure vessel 200 is defined by a neck (not shown) in the arcuate head 230. The opening 250 would receive an o-ring (not shown) and plug (not shown) to seal the pressure vessel 200. When the pressure vessel 200 is sealed, gas enclosed in the pressure vessel 200 cannot escape the pressure vessel 200 and gas outside the pressure vessel 200 cannot enter the pressure vessel 200. The opening 250 can be fitted with a pump and/or valve to load and unload gas to and from the pressure vessel. Since the neck is inverted, it protrudes internally (rather than distally) from the surface of the arcuate head 230 at the opening 250, in contrast to the neck 120 depicted in prior art FIG. 1.

Figure 3:
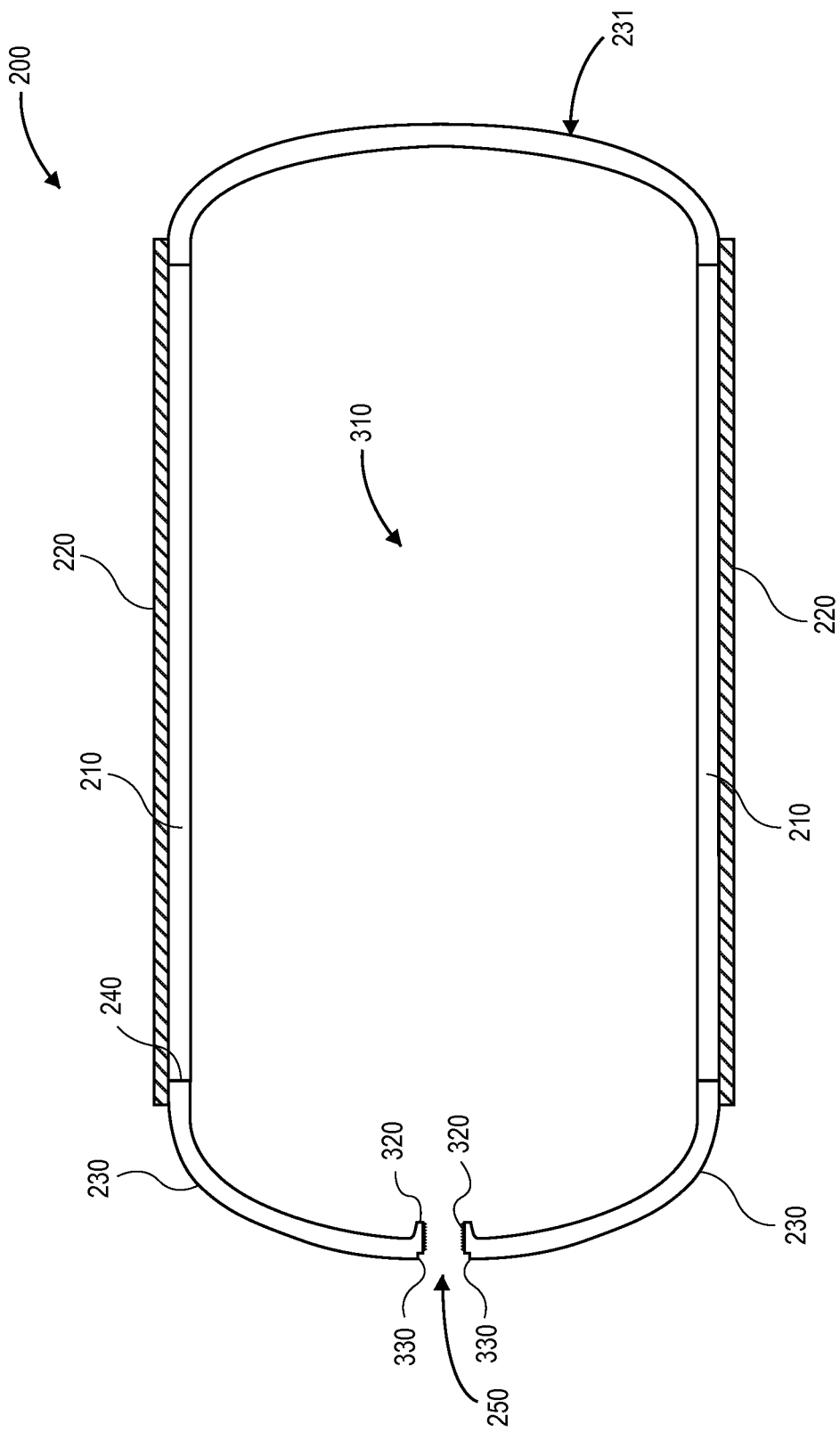
FIG. 3 is a diagram of a cross-sectional view of one embodiment of a pressure vessel.

FIG. 3 is a diagram of a cross-sectional view of one embodiment of a pressure vessel. The pressure vessel 200 may be used to contain and transport gas.

As described in FIG. 2, the pressure vessel 200 includes a cylindrical shell 210 and arcuate head 230 welded together 240. The cylindrical shell 210 is wrapped circumferentially with a composite reinforcement 220.

Gas may be contained for transport in an interior section 310 of the pressure vessel 200. Gas may be loaded to and unloaded from the interior section 310 of the pressure vessel 200 through an opening 250 defined by the neck 320.

The neck 320 is inverted such that it protrudes towards the concave interior of the arcuate head 230, rather than distally from the external surface of the arcuate head 230. The arcuate head 230, including the neck 320, may be extruded from a single unit of material. One feature of the extrusion process is that the neck 320 is thickest towards the external surface of the arcuate head 230 and decreases in thickness towards an interior portion of the arcuate head 230. The neck 320 includes a threaded region to receive a reciprocally threaded plug (not shown) through the opening 250 to seal the pressure vessel 200. The neck 320 also includes an o-ring seat 330 proximate to the external surface of the arcuate head 230. The o-ring seat 330 engages an o-ring (not shown) coupled with the plug to enhance the seal of the pressure vessel 200. A second head 231 may be welded to the opposite end of the pressure vessel. In some embodiments, second head 231 is a blank head (as shown), i.e., it has no neck or opening. In other embodiments, second head 231 may be identical to head 230.

Figure 4:
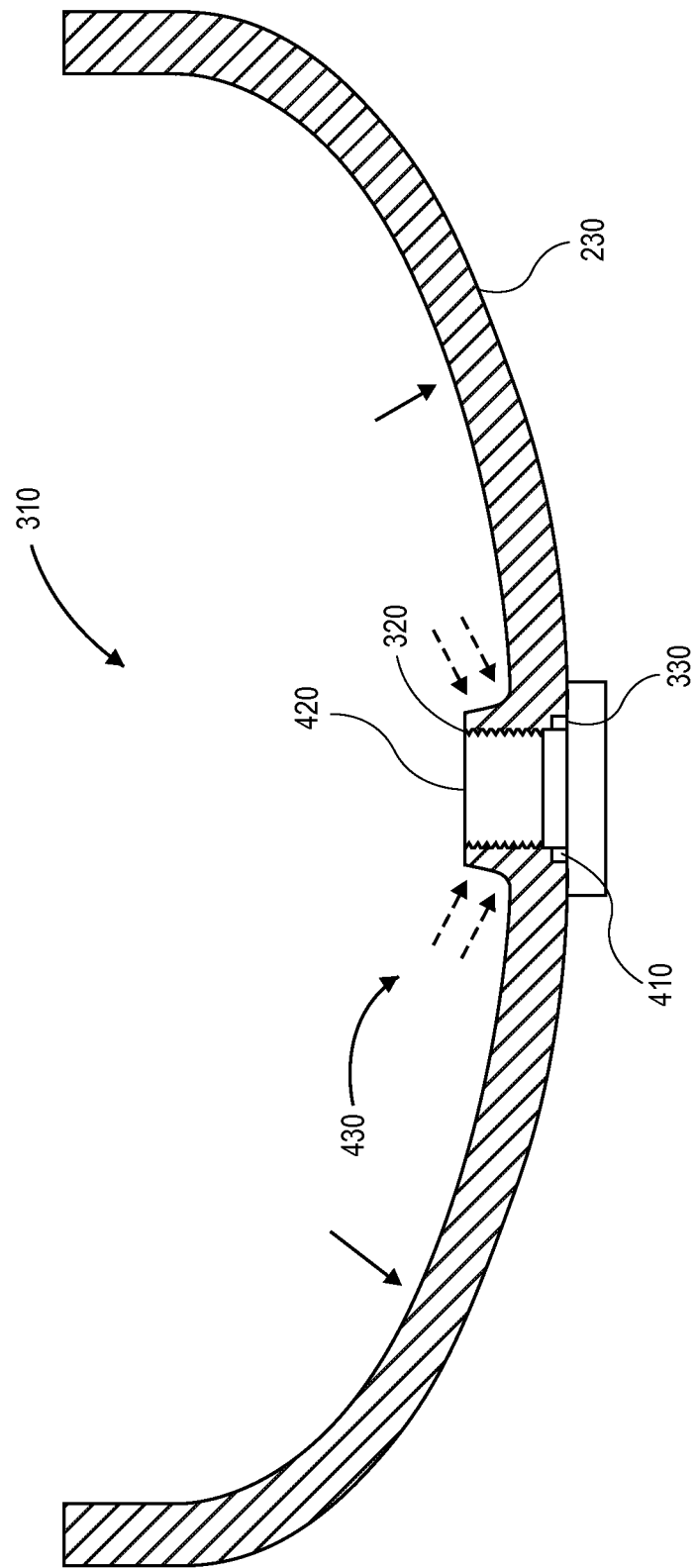
FIG. 4 is a diagram of a cross-sectional view of one embodiment of a pressure vessel head.

FIG. 4 is a diagram of a cross-sectional view of one embodiment of a pressure vessel head that would be welded to a cylindrical shell (not shown) to create a container for transporting gas. This figure presents the view of an arcuate head 230 sealed with a plug 420 and o-ring 410 so that gas enclosed at an interior section 310 of the pressure vessel cannot escape the pressure vessel and gas outside the pressure vessel cannot enter the pressure vessel. In one embodiment, tapered threads may be used instead of using an o-ring. In another embodiment, tapered threads are used in conjunction with an o-ring.

The pressure vessel head 230 includes an integrally formed inverted neck 320. The arcuate head 230 can define a portion of an ellipse, such as a two-to-one ellipse. In addition, the arcuate head 230 can be made of steel having a nominal thickness of ⅞". The neck 320 includes a threaded region and o-ring seat 330 to engage a reciprocally threaded plug 420 coupled with an o-ring 410 to seal the pressure vessel. Since the neck 320 is inverted, the o-ring seat 330 resides in a thicker portion of metal than with distally oriented necks. The thicker metal is better suited to accommodate the o-ring seat 330 without creating an inherent weakness.

When the plug 420 and o-ring 410 are in place, the gas enclosed in the interior section 310 of the pressure vessel creates a force on the interior walls of the arcuate head 230. Specifically, the pressure converges on the neck 320 in the direction of the dotted arrows 430. At high pressure, rather than expanding the neck and the opening defined by the neck so that the plug no longer provides an effective seal (as occurs in the prior art), the pressure 430 inside the arcuate head 230 is situated to increase engagement between the neck 320 and the plug 420 at the protruding end of the neck 320. This configuration permits pressure vessels having an inverted neck 320 to withstand high pressure from compressed gas of up to around 8550 psi before the plug 420 is forcefully blown out of the opening defined by the neck 320. Tests on the distally extended necks found failure pressures between 6500 and 7500 psi.

Testing has shown that high pressure from compressed gas in the pressure vessel may cause the o-ring 410 to disengage from the o-ring seat 330 prior to a failure of the pressure vessel. This is because the o-ring 410 may lose contact with the o-ring seat 330 while the plug 420 is still at least partially engaged with the threaded portion of the neck 320, particularly towards the end of the plug 420 interior to the pressure vessel head. However, the pressure from the gas on the neck forces stronger engagement between the metal constituents of the neck 320 and plug 420 and maintains the seal of the pressure vessel, so that enclosed gas can not escape the pressure vessel and external gas can not enter the pressure vessel. The internally protruding neck also reduces an overall pressure vessel length/unit of gas carried. This can be desirable for transport and storage.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

I claim:
1. A pressure vessel comprising:
a cylindrical metal shell;
a composite reinforcement wrapped circumferentially around the cylindrical metal shell;
a metal head welded to an end of the shell, the head comprising:

a convex exterior wall, a concave interior wall, the interior wall spaced apart from the exterior wall by ahead thickness, and a hollow neck extruded as an integral part of the head, the neck protruding inwardly away from the concave interior wall toward an interior of the pressure vessel, the neck having a distal portion thereof spaced substantially away from the concave interior wall, the neck having a thickness that decreases towards a protruding end of the neck, the neck having internal threads, including within the distal portion;

a plug having a reciprocally threaded region to engage the internal threads of the neck, including within the distal portion;

wherein an internal pressure in the vessel acts on the neck to increase engagement between the neck and the plug at the distal portion of the neck.

2. The pressure vessel of claim 1 wherein the neck defines an o-ring seat.

3. The pressure vessel of claim 2 further comprising:
an o-ring disposed between the plug and the o-ring seat.

4. The pressure vessel of claim 3, wherein the pressure vessel can withstand greater than 2.4 times an operating pressure without failing.

5. The pressure vessel of claim 1, wherein a cross-section of the head defines a two-to-one ellipse.

6. The pressure vessel of claim 1, wherein the head comprises steel having a nominal thickness of greater than ⅞".

7. The pressure vessel of claim 2 wherein the o-ring seat is disposed within the neck adjacent to the convex exterior wall.

* * * * *